United States Patent
Fukunaga

(10) Patent No.: US 6,749,828 B1
(45) Date of Patent: Jun. 15, 2004

(54) PROCESS FOR REFORMING HYDROCARBON

(75) Inventor: Tetsuya Fukunaga, Sodegaura (JP)

(73) Assignee: Idemitsu Kosan Corp Ltd., Tokyo (JP)

( * ) Notice: Subject to any disclaimer, the term of this patent is extended or adjusted under 35 U.S.C. 154(b) by 0 days.

(21) Appl. No.: 09/701,585
(22) PCT Filed: Jun. 4, 1999
(86) PCT No.: PCT/JP99/03002
  § 371 (c)(1),
  (2), (4) Date: Jan. 2, 2001
(87) PCT Pub. No.: WO99/64150
  PCT Pub. Date: Dec. 16, 1999

(30) Foreign Application Priority Data

Jun. 9, 1998 (JP) ............................................. 10-160219
Jul. 14, 1998 (JP) ............................................. 10-198288

(51) Int. Cl.[7] ................................................. C01B 3/26
(52) U.S. Cl. ........................................ 423/651; 252/373
(58) Field of Search ......................... 252/373; 423/651, 423/652; 502/326, 327, 328, 349

(56) References Cited

U.S. PATENT DOCUMENTS

| 5,023,276 A | * | 6/1991 | Yarrington et al. | 518/703 |
| 5,130,114 A | * | 7/1992 | Igarashi | 423/652 |
| 5,134,109 A | * | 7/1992 | Uchiyama et al. | 423/652 |

FOREIGN PATENT DOCUMENTS

| EP | 0 333 037 | 9/1989 |
| EP | 0 406 896 | 1/1991 |
| EP | 0 414 573 | 2/1991 |
| EP | 0 495 534 | 7/1992 |
| EP | 0 548 679 | 6/1993 |
| EP | 0734086 A1 | * 9/1996 | ............ H01M/8/06 |
| JP | 59-97501 | 6/1984 |
| JP | 01-148343 | 6/1989 |
| JP | 5-261286 | 10/1993 |
| JP | 7-88376 | 4/1995 |
| JP | 7-196301 | 8/1995 |
| JP | 8-175805 | 7/1996 |
| JP | 08-175805 | 7/1996 |
| JP | 9-75728 | 3/1997 |
| JP | 09-075728 | 3/1997 |

OTHER PUBLICATIONS

Patent Abstracts of Japan, JP 9–029097, Feb. 4, 1997.
Patent Abstracts of Japan, JP 8–196907, Aug. 6, 1996.
Patent Abstracts of Japan, JP 7–251070, Oct. 3, 1995.
Patent Abstracts of Japan, JP 5–220397, Aug. 31, 1993.
P. D. F. Vernon, et al., Catalysis Today, vol. 13, XP–000490240, pps. 417–426, "Partial Oxidation of Methane to Synthesis Gas and Carbon Dioxide as an Oxidising Agent for Methane Conversion," 1992.

* cited by examiner

Primary Examiner—Steven Bos
Assistant Examiner—Maribel Medina
(74) Attorney, Agent, or Firm—Oblon, Spivak, McClelland Maier & Neustadt, P.C.

(57) ABSTRACT

A catalyst formed of a ziroonia carrier carrying ruthenium and a catalyst formed of an inorganic oxide carrier carrying zirconium and ruthenium provide high conversion in autothermal reforming of a variety of hydrocarbons. The catalysts also provide high yield of carbon monoxide in reforming reaction making use of carbon dioxide and exhibit long-term stable characteristics with a small amount of coke deposition.

21 Claims, 5 Drawing Sheets

PROCESS FOR REFORMING HYDROCARBON

BACKGROUND OF THE INVENTION

1. Field of the Invention

The present invention relates to a hydrocarbon reforming catalyst, and more particularly, to a catalyst comprising ruthenium and zirconium employed in hydrocarbon reforming making use of carbon dioxide; a method for producing the catalyst; and a method for reforming hydrocarbon by use thereof. The present invention also relates to an autothermal reforming catalyst comprising ruthenium and zirconium; a method for producing the catalyst; and a method for producing hydrogen or a synthesis gas by use of the catalyst.

2. Background Art

A variety of techniques are known for producing a synthesis gas and hydrogen through reforming of organic compounds such as hydrocarbon. Particularly, many steam reforming techniques have been brought into practice for reforming hydrocarbon by use of steam. In these techniques, principally, hydrogen or a synthesis gas for producing methanol is produced from a starting material such as methane, LPG, or naphtha by use of a nickel catalyst.

In general, reforming of hydrocarbon through steam reforming involves a large-scale endothermic reaction. Therefore, when steam reforming is carried out on an industrial scale, heat supply from the outside raises a technical problem which must be solved. Particularly, the overall reaction of industrially-employed steam reforming of hydrocarbon by use of a nickel catalyst is considerably endothermic at 600° C.–900° C. For example, the overall reaction of steam reforming of methane is endothermic, with a heat of reaction of 49.3 kcal/mol at about 700° C. Although various attempts have been made toward improving a reactor and a heat recovery system, such improvements do not represent essential solutions for attaining enhanced heat recovery and simplified facilities.

Another known technique for producing a synthesis gas and hydrogen is partial oxidization of hydrocarbon. A technique for producing a synthesis gas and hydrogen by partially oxidizing heavy hydrocarbon, such as vacuum residue, with oxygen at high temperature has already been brought into practice. In addition, Japanese Patent Application Laid-Open (kokai) No. 05-221602 discloses a method for producing a synthesis gas, in which partial oxidation of methane is performed at a temperature nearly equal to that of steam reforming making use of a catalyst comprising zirconium and ruthenium. In this case, heat of oxidation is problematic in that it must be removed. Reforming through partial oxidation requires further studies, in view of stability of reaction and saving energy.

In view of the foregoing, there has been investigated autothermal reforming, in which a starting material for producing a synthesis gas such as hydrocarbon is partially oxidized and simultaneously reformed by use of a reforming gas such as steam, so as to balance heat of reaction.

Conventionally, there has been investigated application of catalysts such as a nickel catalyst, a platinum catalyst, or a palladium catalyst to autothermal reforming. However, these catalysts have drawbacks such as deposition of coke thereon, as pointed out in Int. J. Hydrogen Energy Vol. 8, p539–548 and Hydrogen Energy Progress 4, Vol. 1, p33–45. Thus, autothermal reforming by use of methane as a starting material has been the predominant object of investigation, because the amount of coke deposited on a catalyst is relatively low. Japanese Patent Application Laid-Open (kokai) Nos. 06-256001 and 06-279001 disclose research on production of a synthesis gas through reforming by use of oxygen and steam transformed from methanol by use of a catalyst such as a copper catalyst.

In addition to reactions per se, reactors which can balance heat have been investigated (Journal of Power Sources 61 (1996) p113–124; Hydrocarbon Processing, March 1994, p39–46; and Japanese Patent Application Laid-Open (kokai) No. 07-057756).

Meanwhile, in recent years, carbon dioxide has drawn attention as a substance contributing to global warming. Therefore, in order to fix carbon dioxide and find a use therefor, there has been investigated a method for reforming hydrocarbon by use of carbon dioxide so as to produce a synthesis gas and converting the synthesis gas to products such as methanol, synthetic gasoline, and ethers. Since a number of natural gas fields contain carbon dioxide, there has been investigated a technique for reforming hydrocarbon by use of carbon dioxide as a useful source without isolation from natural gas. However, the technique is not sufficiently developed and thus far has not been brought into practice.

For example, in Nature Vol. 352, Jul. 18, 1991, A. T. Aschroft et al. evaluate catalytic activity of catalysts comprising an alumina carrier carrying Ni, Pd, Ru, Rh, or Ir. Although the Ir catalyst exhibits superior relative catalytic activity, the activity is still insufficient for practical use. Disadvantageous deposition of coke on a catalyst is also pointed out.

In Appl. Catal. 61, 293 (1990), J. T. Lichardson et al. evaluate a ruthenium-on-alumina catalyst and a rhodium-on-alumina catalyst and conclude that deposition of coke is greater on the ruthenium-on-alumina catalyst than on the rhodium-on-alumina catalyst.

Furthermore, Japanese Patent Application Laid-Open (kokai) Nos. 08-175805, 08-259203, 09-075728, and 08-231204 disclose application of a catalyst carrying a Group VIII metal to a process such as reforming of hydrocarbon by use of carbon dioxide.

In addition, Japanese Patent Application Laid-Open (kokai) Nos. 08-196907, 09-029097, and 09-029098 disclose steam reforming of hydrocarbon by use of a catalyst comprising an alumina carrier carrying a metal such as zirconium or ruthenium.

SUMMARY OF THE INVENTION

In view of the foregoing, an object of the present invention is to provide a high-performance catalyst for autothermal reforming. Another object of the present invention is to provide a simple and practical method for producing an autothermal reforming catalyst. Still another object of the present invention is to provide a method for producing hydrogen or a synthesis gas through autothermal reforming making use of the above catalyst.

Moreover, yet another object of the present invention is to provide a catalyst for effectively reforming hydrocarbon by use of carbon dioxide. Another object of the present invention is to provide a simple and practical method for producing a catalyst employed in reforming by use of carbon dioxide. Still another object of the present invention is to provide a method for reforming hydrocarbon by use of carbon dioxide and the above catalyst. Yet another object of the present invention is to provide a method for reforming natural gas by use of the above catalyst. Yet another object of the present invention is to provide a method for reforming hydrocarbon or natural gas by use of a mixture of carbon dioxide and steam and the above catalyst. Yet another object of the present invention is to provide a method for reforming natural gas by use of the above catalyst for reforming hydrocarbon. Yet another object of the present invention is to provide a method for reforming hydrocarbon or natural gas by use of a mixture of carbon dioxide and steam and the above catalyst for reforming hydrocarbon.

The present inventors have conducted earnest studies to solve the above-described problems, and have found that a ruthenium-zirconium catalyst, i.e., a ruthenium-on-zirconia catalyst or a ruthenium-zirconium-on-alumina catalyst, is suitable for autothermal reforming as well as for reforming of hydrocarbon by use of carbon dioxide. The present invention was accomplished based on this finding.

Accordingly, in a first aspect of the present invention, there is provided an autothermal reforming catalyst comprising a zirconia carrier carrying ruthenium.

In a second aspect of the present invention, there is provided an autothermal reforming catalyst comprising an inorganic oxide carrier carrying zirconium and ruthenium.

Preferably, in the first and second aspects of the invention, the catalyst contains ruthenium in an amount of 0.05–20 wt. %. Preferably, in the second aspect of the invention, the catalyst contains zirconium in an amount of 0.05–20 wt. % as reduced to $ZrO_2$.

Preferably, in the first and second aspects of the invention, the catalyst further contains cobalt and/or magnesium, with the preferable cobalt content being 0.01–30 based on atomic ratio of cobalt to ruthenium or the magnesium content being 0.5–20 wt. % as reduced to MgO.

Preferably, in the second aspect of the invention, the inorganic oxide carrier is formed of alumina, more preferably α alumina or γ-alumina.

In a third aspect of the present invention, there is provided a method for producing the autothermal reforming catalyst according to the first aspect of the invention, comprising incorporating a solution containing ruthenium, a solution containing ruthenium and cobalt, or a solution containing ruthenium, cobalt and magnesium into a zirconia carrier and then drying and calcining the carrier.

In a fourth aspect of the present invention, there is provided a method for producing the autothermal reforming catalyst according to the second aspect of the invention, comprising incorporating a solution containing zirconium and ruthenium, a solution containing zirconium, ruthenium, and cobalt, or a solution containing zirconium, ruthenium, cobalt, and magnesium into an inorganic oxide carrier and then drying and calcining the carrier.

In a fifth aspect of the present invention, there is provided a method for producing hydrogen or a synthesis gas by use of the above autothermal reforming catalyst.

Preferably, in the fifth aspect of the invention, a starting material for producing hydrogen or a synthesis gas is a hydrocarbon such as methane, liquefied petroleum gas, naphtha, kerosene, or gas oil; methanol; ethanol; or dimethyl ether.

Preferably, in the fifth aspect of the invention, a reforming gas comprises a mixture of oxygen, steam, and carbon dioxide.

In a sixth aspect of the present invention, there is provided a catalyst for reforming hydrocarbon by use of carbon dioxide comprising a zirconia carrier carrying ruthenium.

In a seventh aspect of the present invention, there is provided a catalyst for reforming hydrocarbon by use of carbon dioxide comprising an inorganic oxide carrier carrying zirconium and ruthenium.

Preferably, in the sixth and seventh aspects of the invention, the catalyst contains ruthenium in an amount of 0.05–20 wt. %. Preferably in the seventh aspect of the invention, the catalyst contains zirconium in an amount of 0.05–20 wt. % as $ZrO_2$.

Preferably, in the sixth and seventh aspects of the invention, the catalyst contains cobalt and/or magnesium, with the preferable cobalt content being 0.01–30 based on the atomic ratio of cobalt to ruthenium and the magnesium content being 0.5–20 wt. % as reduced to MgO.

Preferably, in the seventh aspect of the invention, the inorganic oxide carrier is formed of alumina, more preferably α-alumina or γ-alumina.

In an eighth aspect of the present invention, there is provided a method for producing the catalyst for reforming hydrocarbon by use of carbon dioxide according to the sixth aspect, comprising incorporating a solution containing ruthenium, a solution containing ruthenium and cobalt, or a solution containing ruthenium, cobalt and magnesium into a zirconia carrier and then drying and calcining the carrier.

In a ninth aspect of the present invention, there is provided a method for producing the catalyst for reforming hydrocarbon by use of carbon dioxide according to the seventh aspect, comprising incorporating a solution containing zirconium, a solution containing zirconium and ruthenium, a solution containing zirconium, ruthenium, and cobalt, or a solution containing zirconium, ruthenium, cobalt, and magnesium into an inorganic oxide carrier and then drying and calcining the carrier.

In a tenth aspect of the present invention, there is provided a method for reforming hydrocarbon by use of carbon dioxide and the above catalyst for reforming hydrocarbon.

In an eleventh aspect of the present invention, there is provided a method for reforming natural gas by use of the above catalyst for reforming hydrocarbon.

In a twelfth aspect of the present invention, there is provided a method for reforming hydrocarbon or natural gas by use of a mixture of carbon dioxide and steam and the above catalyst for reforming hydrocarbon.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

BEST MODES FOR CARRYING OUT THE INVENTION

Figure 1:
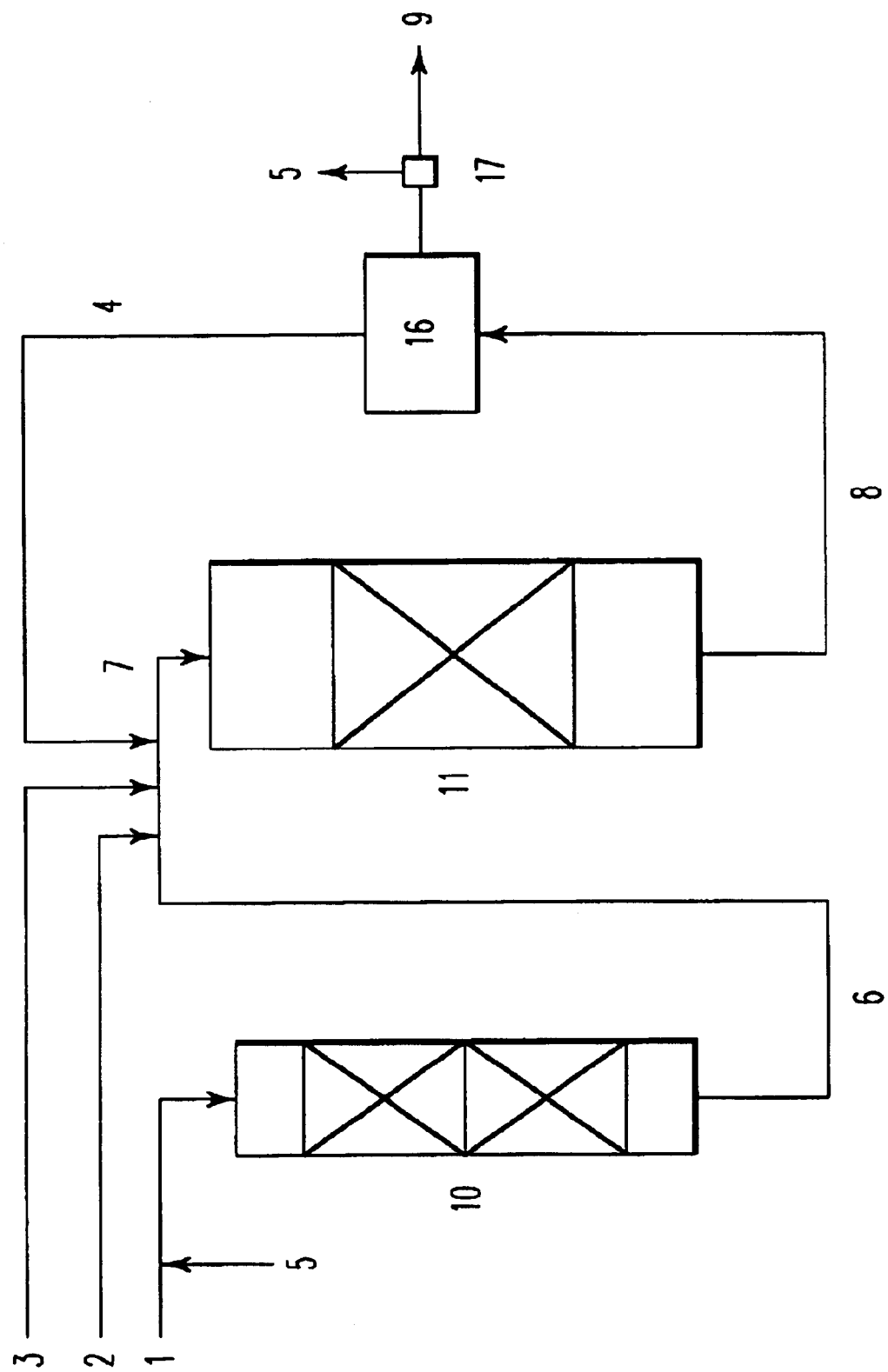
FIG. 1 is a schematic flow chart of an autothermal reforming process.
Figure 2:
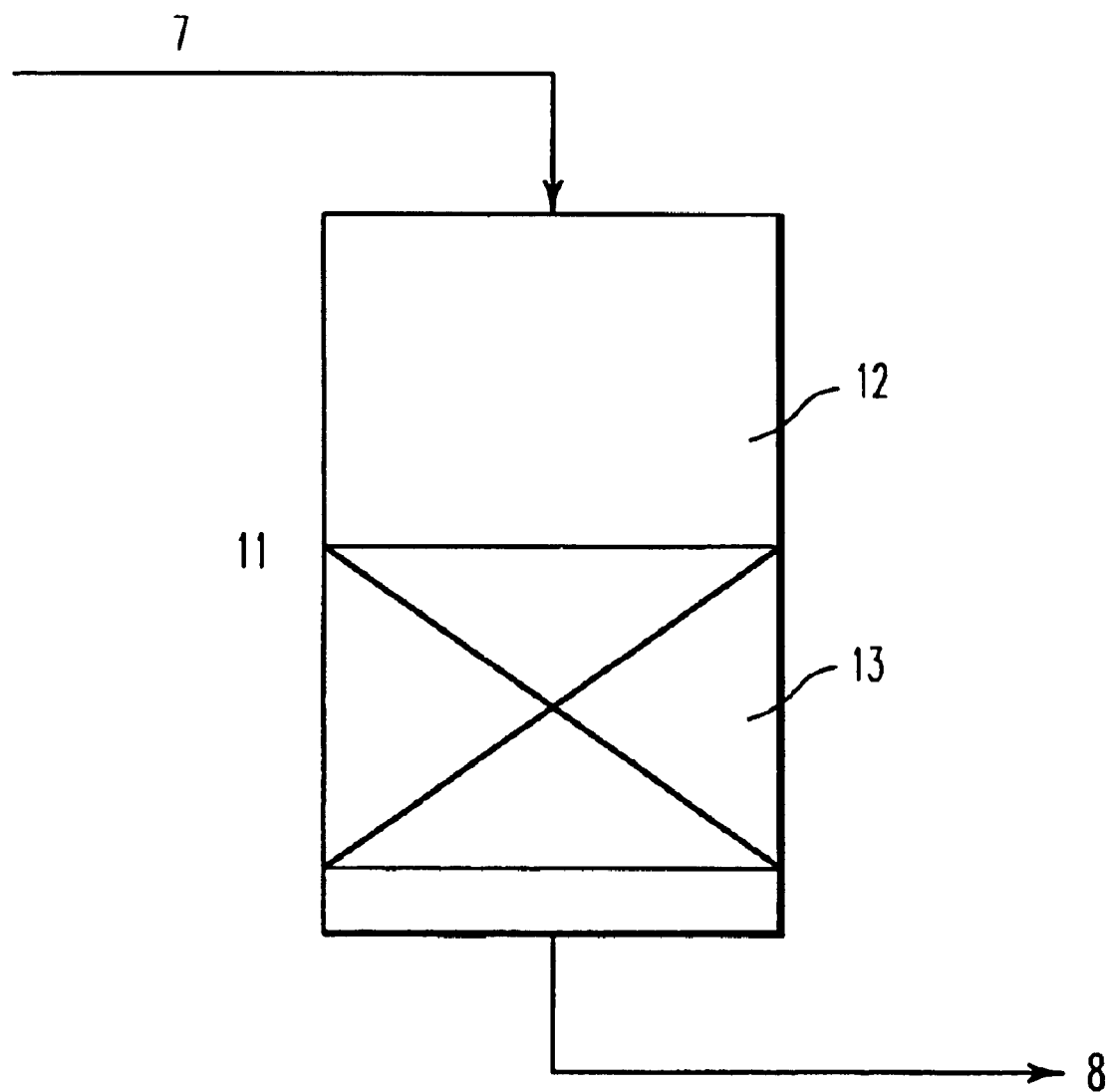
FIG. 2 is a first example of an autothermal reforming reactor.

Modes for carrying out the present invention will next be described.

In the present invention, the term "autothermal reforming" refers to reaction for producing hydrogen or a synthesis gas by reforming an organic compound such as hydrocarbon, alcohol, or ether by use of oxygen and steam. Specifically, the following exothermic oxidation reactions and endothermic steam reforming reactions are combined so as to, to a certain extent, balance overall heat of reaction. The following reactions and heats of reaction are shown in *CHEMTEC* DECEMBER 1995, p43.

[Oxidation of methane by oxygen]

$CH_4 + 2O_2 = 2H_2O + CO_2$ $\Delta H = -192$ kcal/mol $CH_4 + 1.5O_2 = 2H_2O + CO$ $\Delta H = -124$ kcal/mol $CH_4 + O_2 = 2H_2 + CO_2$ $\Delta H = -78$ kcal/mol $CH_4 + 0.5O_2 = 2H_2 + CO_2$ $\Delta H = -8.5$ kcal/mol

[Steam reforming of methane]

$CH_4 + H_2O = 3H_2 + CO$ $\Delta H = 49.3$ kcal/mol $CH_4 + 2H_2O = 4H_2 + CO_2$ $\Delta H = 39.2$ kcal/mol.

In autothermal reforming, generally, reactions such as reaction between methane and $CO_2$ and reaction between CO and steam as well as the abovedescribed reactions occur in parallel, to thereby form a synthesis gas in which overall equilibrium among hydrogen, CO, steam, $CO_2$, and methane is thermodynamically attained.

The autothermal reforming according to the present invention proceeds in the presence of a suitable catalyst. One embodiment for the above catalyst is a ruthenium-on-zirconia catalyst.

Examples of the zirconia catalyst include zirconia per se represented by the formula $ZrO_2$, stabilized zirconia containing a stabilizing component such as magnesia; a zirconia carrier containing another component; and a stabilized zirconia carrier. Examples of the suitable stabilizing components of stabilized zirconia include magnesia, yttria, and ceria. Of these, magnesia-stabilized zirconia is preferably employed as the catalyst carrier, in view of stability as a carrier, and catalyst activity and continuity thereof when formed into a catalyst; e.g., a ruthenium-on-carrier catalyst.

In the present invention, at least ruthenium is used as a metal of a catalyst comprising the above zirconia catalyst. Although ruthenium has catalytic activity similar to that of Ni or Pd included in Group VIII metals during reaction such as steam reformation of hydrocarbon, ruthenium uniquely shows suitable results during autothermal reforming. Such a unique catalytic activity is assumed to be attributed to a certain interaction between ruthenium and zirconia.

Another embodiment of the ruthenium catalyst according to the present invention is a catalyst comprising an inorganic oxide carrier carrying zirconium and ruthenium. The catalyst shows catalytic activity equivalent to that of the ruthenium-on-zirconia catalyst. Briefly, an important factor for the catalyst of the present invention is a certain interaction between zirconia and ruthenium.

In the present invention, an inorganic oxide carrier may be employed as a catalyst which is applied to reaction of typical hydrocarbon as a starting material. Specifically, an inorganic oxide carrier which is used for a catalyst for steam reforming of hydrocarbon is suitably employed. Specific examples include alumina, silica, titania, silica-alumina, and boron-containing or phosphorus-containing alumina. Although the above-described zirconia carrier may be used, preferably inorganic oxide carriers other than the zirconia carrier are used. Generally, inorganic oxide carriers such as an alumina carrier have a specific area larger than that of a zirconia carrier and a strength higher than that of a zirconia carrier, and are easily produced.

Among the above-described inorganic oxide carriers, an alumina carrier is preferred. Among the alumina carriers, an α-alumina carrier and a γ-alumina carrier are particularly preferred. An α-alumina carrier disclosed in Japanese Patent Application Laid-Open (kokai) No. 10-52639 is particularly preferred as the α-alumina carrier. A powder-form α-alumina, which has substantially no internal micropores, usually has poor surface area and, therefore, is not employed as a typical catalyst carrier. However, when the powder-form alumina is shaped into a carrier, the mechanical strength is high, to thereby find use thereof in the carrier disclosed in Japanese Patent Application Laid-Open (kokai) No. 10-52639 as well as use as a carrier for the autothermal reforming catalyst used in the present invention. No particular limitation is imposed on the γ-alumina carriers, and a variety of known γ-alumina carriers used for other catalysts are preferably employed. For example, a γ-alumina carrier used in catalysts for reaction such as hydrogenation, reforming, cracking, or isomerization of hydrocarbon may be employed. In addition, γ-alumina carriers which are used in catalysts for steam reforming of hydrocarbon may also be employed. The alumina carriers are not necessarily formed of α-alumina crystals or γ-alumina crystals, and may contain alumina of another crystal form, such as η-alumina or amorphous alumina.

In the above catalyst in which an inorganic oxide carrier carries at least zirconium and ruthenium, zirconium and ruthenium may be incorporated into a carrier simultaneously or in separate steps.

The metals of the catalyst used in the present invention are converted to the corresponding oxides by calcining to prepare the catalyst. The catalyst is preferably reduced in advance to serve as an autothermal reforming catalyst.

In the present invention, cobalt or cobalt and magnesium may be incorporated into the catalysts according to the first and second embodiments. Cobalt is added so as to enhance catalytic activity, whereas magnesium is added so as to enhance properties, such as thermal stability, of zirconia carrier or zirconia on an inorganic oxide carrier.

The amount of metals on a carrier of the catalyst used in the present invention will next be described.

As described below, the amount of a metal component is specified as reduced to the corresponding compound such as a metal oxide, and the amount of metal based on the entirety of the catalyst is calculated based on the reduced amount.

The catalyst according to the first embodiment contains ruthenium in an amount of typically 0.05–20 wt. %, preferably 0.05–3 wt. %, more preferably 0.1–2 wt. %, based on the entirety of the catalyst as reduced to the corresponding compound such as a metal oxide. When the amount of ruthenium is less than 0.05 wt. %, attained autothermal reforming might be insufficient, whereas when it is in excess of 20 wt. %, ruthenium may aggregate on the carrier surface to reduce the specific surface area, to thereby decrease effective active sites and lower the catalytic activity.

The catalyst according to the second embodiment contains ruthenium and zirconium. The amount of ruthenium is similar to that in the first embodiment. The amount of zirconium, as reduced to zirconia ($ZrO_2$), is typically 0.05–20 wt. %, preferably 0.5–15 wt. %, more preferably 1–15 wt. % based on the entirety of the catalyst. When the amount of zirconium is less than 0.05 wt. %, catalytic activity based on zirconium and ruthenium is poor, whereas when it is in excess of 20 wt. %, the mechanical strength and specific surface area of the catalyst might decrease, to thereby raise problems in practical use.

Cobalt is added to the catalysts according to the first and second embodiments in an amount of preferably 0.01–30 based on the atomic ratio of cobalt to ruthenium, more preferably 0.1–30, particularly preferably 0.1–10. When the amount is less than 0.01, enhancement of the catalytic activity attributed to addition of cobalt might be insufficient, whereas when it is in excess of 30, catalytic activity of ruthenium per se might decrease.

Moreover, when magnesium is added in addition to cobalt, it is added in an amount of typically 0.5–20 wt. %, preferably 0.5–15 wt. %, more preferably 1–15 wt. %, as reduced to magnesia (MgO) based on the entirety of the catalyst.

A method for producing the catalyst used in the present invention will next be described.

First, a method for producing the ruthenium-on-zirconia catalyst used in the present invention will be described.

(1) Production of a Zirconia Carrier

The zirconia carrier can be produced through any of a variety of known methods. For example, it can easily be produced by the steps of dissolving a zirconium sound in a solvent such as water or alcohol; adjusting the pH of the resultant solution; adding a bad solvent to the solution to thereby precipitate zirconium hydroxide; separating the precipitate from the solution; and drying and calcining the precipitate. No particular limitation is imposed on the zirconium compound so long as it contains zirconium and can be dissolved in a solvent. Examples of preferable zirconium compounds includes zirconium halides such as zirconium tetrachloride; zirconium oxyhalides such as zirconyl chloride; zirconium or zirconyl salts such as zirconyl sulfate and zirconyl nitrate; zirconate salts; zirconium alkoxides; and zirconium complex salts. In order to stabilize zirconia, a magnesium compound may also be added to an aqueous solution of a zirconia precursor. Furthermore, another substance may be added to the aqueous solution within the scope in which a target carrier of the present invention can be obtained. For example, in order to enhance solubility of zirconium salts, acids may be added to the solution, which is further heated. The pH of the solution of a zirconium compound is adjusted by adding an alkaline substance such as alkali hydroxide or aqueous ammonia. The resultant precipitate of zirconium hydroxide is separated, dried, and shaped, and the shaped compact is calcined, to thereby produce a zirconia carrier. Preferably, the compact is calcined in air at 300° C. or more, preferably 400° C. or more, for 1–5 hours. In the present invention, there may also be employed as a carrier commercially available zirconia or zirconium oxide as such or commercially available powder thereof which is molded into a desirable shape.

(2) Production of a Ruthenium-carrying Catalyst

The ruthenium-carrying catalyst can be produced by combining ruthenium with the above-described zirconia carrier through a customary method. For example, a ruthenium compound is dissolved in a solvent such as water or alcohol. The ruthenium compound which is used in the present invention may be selected from among a variety of known compounds. Examples of the ruthenium compounds include ruthenium halides such as ruthenium trichloride and amine complex salts such as hexaammineruthenic chloride. There may also be used a commercially available aqueous solution of ruthenium tetraoxide or an aqueous solution in which the concentration of ruthenium is modified. When ruthenium oxide and ruthenium hydroxide which have poor solubility to water are used, the compounds may be dissolved by modifying the pH of the solvent in the presence of an acid. Of such compounds, ruthenium halides such as ruthenium trichloride are preferred.

In addition to ruthenium, a cobalt component or a magnesium component may be separately incorporated before or after combining of ruthenium with a carrier. Typically, a cobalt compound or a magnesium compound is dissolved into a ruthenium-containing solution, and the mixture solution is combined with a carrier, to thereby conveniently attain simultaneous combining. No particular limitation is imposed on the cobalt or magnesium compounds so long as they can be dissolved in a solvent, such as water or alcohol, that is typically used for preparing a catalyst. Examples of the compounds include cobalt nitrate, basic cobalt nitrate, cobalt dichloride, magnesium nitrate, and magnesium chloride.

A ruthenium-on-zirconia catalyst can be obtained by combining the solution containing ruthenium and one or more metal components with a zirconia carrier; drying; and calcining. No particular limitation is imposed on the method of combining, and preferable examples thereof include impregnation, dipping, and spray-coating. The desirable extent of combining is attained by appropriately adjusting factors such as the concentration of ruthenium in a solution for incorporation, the amount of solution, and the number of the steps for combining. An appropriate method for drying may be selected from among customary methods, such as allowing to stand in air and drying at 50° C.–150° C. in air or in a nitrogen stream. When the treated carrier is calcined, a compound incorporated in the carrier is decomposed to the corresponding metal, metal oxide, or mixed-valence metal oxide. Therefore, calcining is conducted under conditions such that the incorporated compound does not aggregate to thereby decrease catalytic activity and such that the crystal structure of the carrier is neither destroyed nor changed. Specifically, calcining is conducted at typically 300° C.–1000° C., preferably 300° C.–700° C., more preferably 400° C.–600° C., for 1–5 hours in air or in a nitrogen stream.

Combining of a ruthenium compound with a carrier may be conducted by kneading a slurry of the ruthenium compound and the zirconia carrier. The kneaded mixture is dried and calcined, to thereby produce a suitable ruthenium-on-zirconia catalyst.

A method for producing the zirconium-ruthenium-inorganic oxide catalyst used in the present invention will next be described with reference to a zirconium-ruthenium-alumina catalyst, which is a typical example. Similar catalysts using an inorganic oxide carrier other than an alumina carrier can be produced according to similar methods.

(1) Production of an Alumina Carrier

Alumina carriers such as an α-alumina carrier or a γ-alumina carrier can be produced through any of a variety of known methods.

Typically, the alumina carriers can be produced by molding commercially available alumina powder as a starting material and sintering the formed compact. Although a variety of alumina powders other than α-alumina powder may be used, α-alumina powder is preferred. The α-alumina powder which is used as a starting material has an average particle size of 0.01–100 μm, preferably 0.05–50 μm, more preferably 0.05–30 μm. Uniform particle size is particularly preferable. Production of α-alumina powder having a uniform average particle size of less than 0.01 μm is difficult, whereas when the powder has an average particle size of 50 μm or more, the micropore capacity and specific surface area of an α-alumina carrier made from the powder decreases to possibly deteriorate catalytic activity of a catalyst carrying a metal such as ruthenium. In order to increase the micropore capacity and specific surface area of an α-alumina carrier and facilitate molding and sintering, to a starting α-alumina powder there may be added organic compounds such as starch, wax, polyethylene glycol, methyl cellulose, carboxymethyl cellulose, and glycerin; clay minerals such as kaolin and bentonite; and water glass. Of these, clay minerals such as kaolin and bentonite and water glass are suitable for increasing the micropore capacity and specific surface area of an α-alumina carrier α-alumina may be molded through a customarily employed method. With regard to calcining, when the starting powder is formed of alumina other than α-alumina, it must typically be calcined at 1000° C.–1400° C., whereas when α-alumina powder is used, it may simply be molded into a shape of a target catalyst and then subjected to sintering.

Production of a γ-alumina carrier will next be described. First, an aluminate salt solution such as an aqueous solution of sodium aluminate and an aluminum salt solution such as an aqueous solution of aluminum sulfate are mixed and the pH of the resultant mixture is adjusted, to thereby precipitate aluminum hydroxide. In this case, an inorganic acid or an organic acid is added for adjustment of pH, to thereby suitably precipitate aluminum hydroxide. The precipitate is separated and washed with water, aqueous ammonia, etc., to thereby obtain an aluminum hydroxide slurry, which is molded. The compact is dried to produce a γ-alumina carrier. No particular limitation is imposed on the method for molding, and extrusion molding is typically employed. Calcining is performed at a temperature at which γ-alumina is formed. The calcining conditions are selected so that the formed γ-alumina does not disappear while being allowed to stand at high temperature for a long period. Typically, calcining is conducted in air at 300° C.–1000° C., preferably at 400° C.–600° C., for 1–5 hours.

Commercially available γ-alumina as such may also be employed. Alternatively, commercially available powder thereof is molded into a desirable shape and calcined, to thereby serve as a catalyst carrier.

(2) Production of a Zirconium-ruthenium-on-alumina Catalyst

The zirconium-ruthenium-alumina catalyst can be produced by combining ruthenium and zirconium with the above-described alumina carrier through a customary method. Briefly, a solution containing ruthenium and a solution containing zirconium are individually prepared, or a solution containing ruthenium and zirconium is prepared, to serve as a solution to be combined with the above-described alumina carrier. No particular limitation is imposed on the solvents which are used for preparing the above solutions, and they are appropriately selected from known solvents typically used for preparing a catalyst, such as water and alcohol. The ruthenium compound which may be used in the present embodiment is similarly selected from ruthenium compounds which have already been described in connection with the ruthenium-carrying catalyst, and examples thereof include ruthenium halides such as ruthenium trichloride. No particular limitations is also imposed on the zirconium compounds so long as they can be dissolved in a solvent such as water. Examples include zirconium halides such as zirconium tetrachloride or partially hydrolyzates thereof; zirconium oxyhalides such as zirconyl chloride; zirconium oxoacid salts such as zirconyl sulfate, zirconium nitrate, and zirconyl nitrate; and zirconium organic acid salts such as zirconium acetate and zirconyl acetate. When the zirconium compounds are dissolved, the pH of the solution is adjusted by an agent, such as an acid, to 3 or less, preferably 1.5 or less. When the pH is greater than 3, the zirconium compounds hydrolyze, to possibly form sol or gel of zirconia.

A solution containing a zirconium compound and a ruthenium compound is preferred as the above solution for preparing the catalyst. The pH of the solution is adjusted by an agent, such as an acid, to 3 or less, preferably 1.5 or less. When the pH is adjusted to 3 or less, formation of sol or gel formed of a hydrolyzate of the zirconium compound is prevented and a complex-like compound which is obtained by mutually reacting the zirconium compound and ruthenium compound is easily formed. It is assumed that the carrier combined with the complex-like compound is calcined, to thereby attain a suitable carrying condition of zirconium and ruthenium and excellent catalyst activity.

In the present invention, a cobalt component or a magnesium zirconium, through a method and by use of a cobalt compound and a magnesium compound similar to the method and the compounds described for preparing the above-described ruthenium-carrying catalyst.

The thus-obtained alumina carrier combined with a zirconium compound and a ruthenium compound is dried and calcined, to thereby produce a zirconium-ruthenium-alumina catalyst. No particular limitation is imposed on the methods for combining, drying, and calcining, and there may be employed methods similar to those described for preparing the above-described ruthenium-carrying catalyst. Thus, repeated description thereof is omitted.

Autothermal reforming according to the present invention can be performed in the same way as in conventional reforming of hydrocarbon by use of steam or carbon dioxide. Embodiments of typical autothermal reforming processes according to the present invention will be described below.

(1) Feedstocks

Although feedstocks used for the reaction are selected from among organic compounds, no particular limitations are imposed. Generally, hydrocarbons are suitably used. Examples include saturated aliphatic hydrocarbons such as methane, ethane, propane, butane, pentane, hexane, cyclopentane, and cyclohexane; unsaturated aliphatic hydrocarbons such as ethylene, propylene, and butene; and aromatic hydrocarbons such as benzene, toluene, and xylene. There may also be used alcohols such as methanol and ethanol, and ethers such as dimethyl ether. When these oxygen-containing compounds are used as starting materials, a low reaction temperature can be employed, and the reactions may be advantageous in terms of catalyst life and heat recovery.

Mixtures of these starting materials can effectively be used. For example, natural gas including methane as its primary component, ethane, and propane; LPG; naphtha; kerosene; and light oil are industrially and practically useful.

Moreover, since oxygen, steam, and carbon dioxide are used as reforming gases to reform hydrocarbons, hydrocarbons including these gases can be used. For example, in natural gas, carbon dioxide, steam, oxygen, nitrogen, and other impurities comprising gases other than hydrocarbons exist in mixed form. However, natural gas can be used as feedstock without separation and removal of these impurity gases. Although, as mentioned below, feedstock hydrocarbons are often used after desulfurization, unreacted hydrogen may remain in the material. However, in order to increase the purity of hydrogen gas or synthesis gases as the reaction product, the impurities in the feedstock hydrocarbons preferably consist predominantly of only compounds of C, H, and O, such as carbon dioxide, steam, carbon monoxide, hydrogen, or oxygen, and relatively small amounts of nitrogen, ammonia, and helium. However, when hydrogen is produced for the feedstock for production of ammonia, or for fuel cells, removal of nitrogen gas is not required.

Some feedstock hydrocarbons contain sulfur compounds such as hydrogen sulfide and mercaptan. However, preferably, feedstock hydrocarbons contain sulfur in an amount of 50 ppm by weight or less, more preferably 1 ppm by weight or less, particularly preferably 100 ppb by weight or less. When hydrocarbons containing sulfur in an amount of more than 50 ppm by weight are used as starting materials, catalysts may become poisoned, and use thereof is not preferable, in view of failure to attain long-term use of the catalysts.

According to the present invention, methane, liquefied petroleum gas (LPG), naphtha, kerosene, and gas oil are particularly suitably used as feedstocks for autothermal reforming. Further, oxygen-containing compounds, particularly methanol, ethanol, and dimethyl ether, are used as preferable starting materials. Nickel-based catalysts used in conventional autothermal reforming involve problems in that the catalysts do not have sufficiently long life because of deposition of coke thereon when hydrocarbons of comparatively high molecular weight are used as feedstocks. However, because the catalysts of the present invention have very little deposition of coke thereon, they enable preferable production of hydrogen or synthesis gas even when any of the above-described hydrocarbons are used as the feedstocks. However, when hydrocarbons having a high sulfur content, such as heavy oil, are used, the hydrocarbons are preferably subjected to desulfurization prior to autothermal reforming reaction, so as to reduce sulfur content to the above-described concentration.

(2) Reforming Gas

Reforming gas refers to a gas producing hydrogen or synthesis gas by means of reaction with feedstocks; that is, reforming gas refers to oxygen, steam, or carbon dioxide. The feed proportions of steam, oxygen, or carbon dioxide with respect to feedstock hydrocarbons are selected based on the type of feedstock, the heat balance of the reaction system, the desired component proportions of produced synthesis gas, and the target conversion. Generally, complete reforming of feedstocks is preferable. Therefore, preferably, reforming gas is fed in excess of a stoichiometrically required amount. Especially, when steam is used as a reforming gas, the steam is preferably fed in an excessive amount. Preferably, the ratio of oxygen to steam is adjusted in accordance with the feedstocks and the target product. For example, in order to produce more hydrogen, an excessive amount of steam is reacted at a comparatively high temperature so as to attain advantageous chemical equilibrium. In order to produce more synthesis gas, preferably, the amount of oxygen is changed in accordance with the target composition of a synthesis gas to be produced, or carbon dioxide is used as a portion of reforming gas.

The case in which methane is used as a feedstock will be described in more detail by way of example. In stoichiometric reforming reaction making use of steam, the ratio of hydrogen to carbon monoxide in the obtained synthesis gas is 3/1. However, excessive feed of steam converts carbon monoxide into hydrogen and carbon dioxide (water-gas shift reaction), to thereby produce a hydrogen-rich gas having a high ratio of hydrogen to carbon monoxide. Carbon dioxide in the produced gas is easily separated from hydrogen, and industrially useful highly-pure hydrogen gas can be produced thereby. The obtained hydrogen gas can also be preferably used as feed gas for fuel cells.

When methanol is to be produced, or synthetic gas oil or synthetic gasoline is to be produced through Fischer-Tropsch reaction, the stoichiometrically required ratio of hydrogen to carbon monoxide is said to be about 2/1. In reforming reaction making use of steam, the ratio of hydrogen to carbon monoxide in obtained gas exceeds 3/1. However, the ratio can be easily adjusted to 3/1 or less by adding oxygen to the feedstock and partially oxidizing methane. In the case of reforming by use of carbon dioxide, since a synthesis gas having a ratio of hydrogen to carbon monoxide of 1/1 is obtained, the above-described ratio can be easily adjusted to 3/1 or less through use of both steam and carbon dioxide. That is, by replacing conventional reforming of hydrocarbons with steam, autothermal reformation of hydrocarbons can easily produce a synthesis gas having a ratio of hydrogen to carbon monoxide of about 2/1.

In autothermal reforming, including that according to the present invention, since the heat balance in reforming reaction can be adjusted through changing the amount of oxygen, the temperature of catalyst layer can quickly increase to the desired temperature at the initiation of reaction. Therefore, autothermal reforming is suitable for production of starting material hydrogen used for fuel cells, in which the reaction is frequently initiated and ceased.

When oxygen is added, an industrially preferable reaction is one which employs steam containing oxygen of such a concentration that the heat balance between exothermic reaction by oxidation and endothermic reaction by reforming is maintained. Reforming gas such as oxygen or steam may be added to the reaction simultaneously with feedstock organic compounds (typically, methane, LPG, or naphtha), separately, or stepwise.

Preferably, the ratio of steam fed to the reaction system to the feedstock, i.e. the ratio of steam/carbon; more specifically, the number of water molecules/the number of carbon atoms in the feedstock including neither those in impurities nor those in carbon dioxide used as reforming gas in the feedstock described in (1), is typically 0.1–10, more preferably 0.4–4. When the ratio is below the above-described range, coke tends to deposit on the catalyst, and the content of hydrogen in the synthesis gas tends to decrease. However, when the ratio of steam/carbon is above the above-described range, excessive unreacted steam remains in the produced gas, which is economically disadvantageous.

The ratio of oxygen to the feedstock fed to the reaction system, i.e., the ratio of oxygen/carbon; more specifically, the number of oxygen molecules/the number of carbon atoms in the starting material is typically 0.1–1, more preferably 0.2–0.8. When the ratio of oxygen/carbon is below the above-described range, the exothermic reaction is not predominant. Therefore, in this case, because the addition of a great amount of heat from the outside is required, the reaction substantially resembles a reforming reaction making use of steam. However, when the ratio is above the above-described range, the reaction becomes economically disadvantageous in terms of heat balance because of excessive exothermic heat. Further, in this case, oxidation reaction proceeds excessively, and the yield of hydrogen or the yield of synthesis gas based on the feedstock tends to decrease. With regard to oxygen, pure oxygen or air may be used, and a gas inert to autothermal reforming such as nitrogen; steam, carbon monoxide, or carbon dioxide way be contained therein. Practically, the hydrogen and synthesis gas obtained from autothermal reforming using air may also be used as feed gas for fuel cells, production of ammonia, Fischer-Tropsch reaction, or synthesis of methanol.

When carbon dioxide is mixed in gas to be reformed, the ratio of carbon dioxide to carbon, i.e., the number of carbon dioxide molecules/the number of carbon atoms in feedstock, is typically 0.1–5, preferably 0.1–3. When the ratio is below the above-described range, use of carbon dioxide is not effective. When the ratio is above the above-described range, coke tends to deposit on the catalyst, and production of a synthesis gas having a high hydrogen content is difficult.

Introduction of carbon dioxide is preferable for production of a synthesis gas having a high carbon monoxide content when an amount of oxygen introduced is small. The introduction is especially preferable in the case in which a restriction on feed of oxygen is required due to heat balance. In order to produce hydrogen, feedstock containing no carbon dioxide is preferable. However, the present invention can be applied to the case in which feedstock contains carbon dioxide. In the case where removal of carbon dioxide prior to autothermal reforming reaction is not economically advantageous, preferably, the reaction is performed by use of feedstock containing carbon dioxide.

(3) Reaction Type, and Production Process of Hydrogen or a Synthesis Gas

The reaction type is not particularly limited, and may include a fixed-bed type, a moving-bed type, or a fluidized-bed type. The fixed-bed reactor is typically used.

An autothermal reforming process of natural gas using a fixed-bed reactor is illustrated in FIG. 1. The same process can be used for autothermal reforming of naptha or LPG. First, natural gas is desulfurized in a desulfurization unit 10, to thereby remove sulfur. The feedstock is typically hydrodesulfurized in the desulfurization unit 10, and the produced hydrogen sulfide therein is washed for removal. In this case, a substance absorbing hydrogen sulfide, such as zinc oxide, may be placed into the bottom layer of catalyst layer, to thereby remove hydrogen sulfide. Subsequently, a mixture gas 7 which is formed by adding steam 2, oxygen 3, and optional carbon dioxide to the desulfurized natural gas 6 from which hydrogen is not typically separated is introduced into an autothermal reforming reactor 11. The natural gas is autothermally reformed, e.g. partially oxidized and reformed, to thereby obtain an impure synthesis gas 8. The synthesis gas 8 is processed at a carbon dioxide-separator 16 and at an excessive-hydrogen-separator 17, to thereby obtain a synthesis gas having a desired ratio of hydrogen/carbon monoxide 9. The carbon dioxide 4 separated at the carbon dioxide-separator 16 may be again introduced into the autothermal reforming reactor 11. The hydrogen 5 separated at the excessive-hydrogen-separator 17 may be used, to thereby desulfurize the natural gas serving as a feedstock. Further, the carbon dioxide-separator 16 and the hydrogen-separator 17 may be omitted by adjusting amounts of oxygen, steam, and carbon dioxide.

Preferably, the type of the autothermal reforming reactor 11 is selected from the types shown in FIGS. 2 through 5. At the primary reactor 12 shown in FIG. 2, the temperature of feedstock is elevated to a desired temperature for the catalytic reaction by partially oxidizing the feedstock in the absence of catalyst. At the secondary reactor 13, the autothermal reforming reaction is completed by use of the catalyst of the present invention. In this case, preferably, the method for introducing a reforming gas and the structure of the autothermal reforming reactor 11 are elaborated such that the heat balance between the primary reactor 12 and the secondary reactor 13 is maintained.

Figure 3:
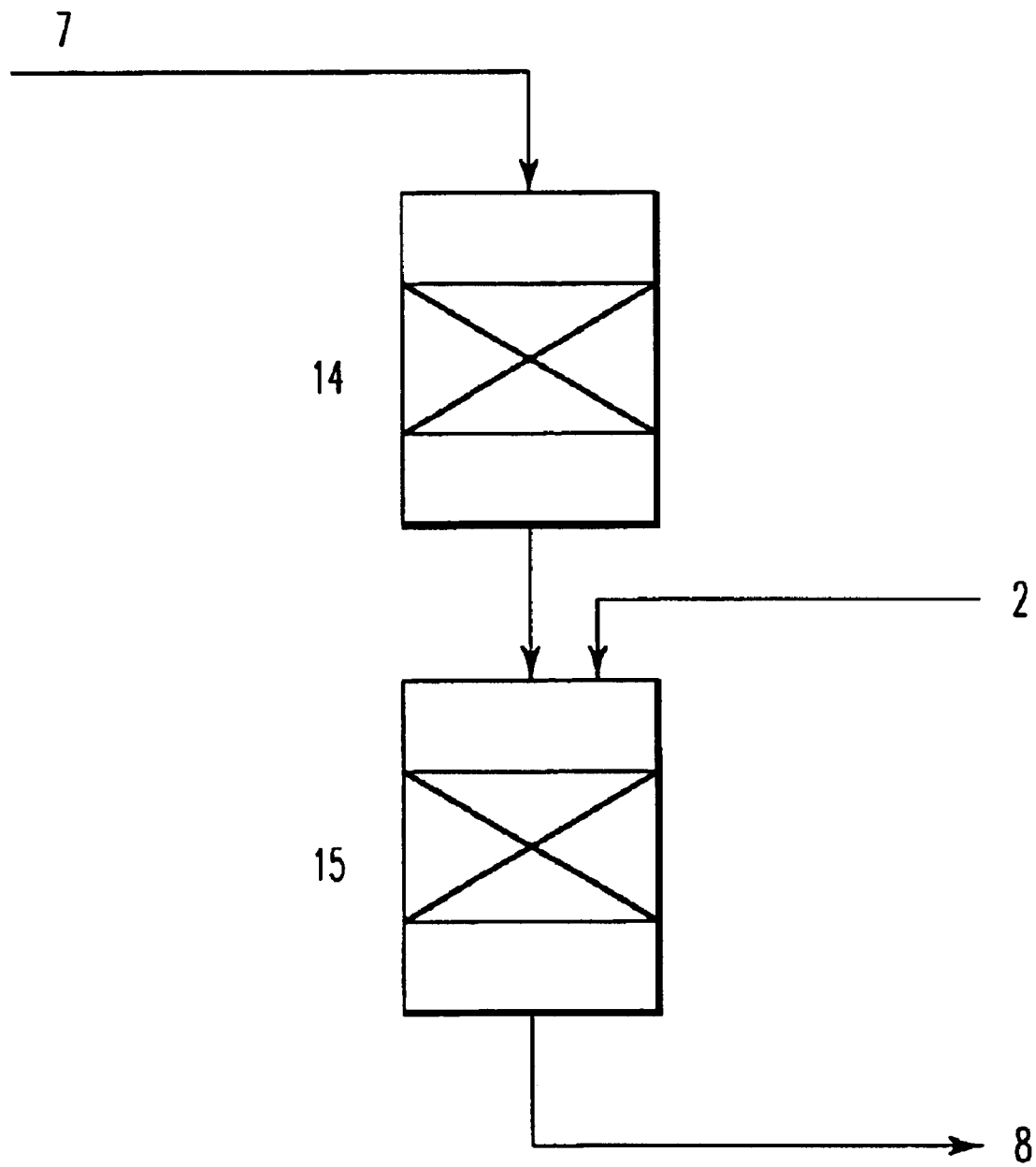
FIG. 3 is a second example of an autothermal reforming reactor.
Figure 4:
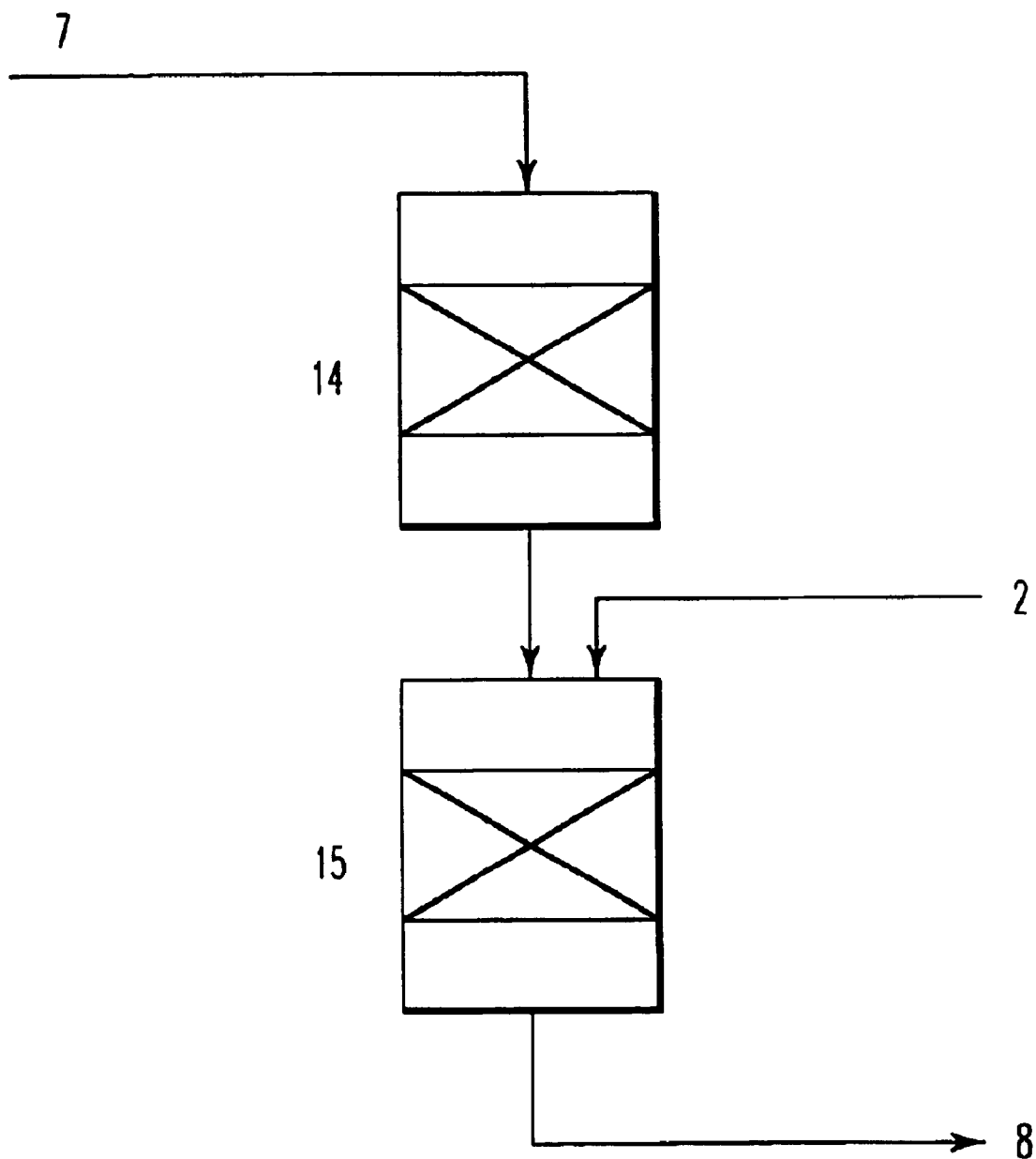
FIG. 4 is a third example of an autothermal reforming reactor.

FIG. 3 shows an example in which a comparatively large amount of steam is introduced. First, a mixture gas 7 is introduced into a primary reactor 14; the oxidation reaction is mainly permitted to proceed in the presence of an oxidation catalyst such as a platinum-palladium catalyst; and the temperature of reactants is elevated therein. At a secondary reactor 15, steam is introduced in the presence of the catalyst of the present invention, to thereby permit the autothermal reforming reaction, in which the main reaction is a reforming reaction by use of steam, to proceed. FIG. 4 shows an example in which an oxidation catalyst is not used at the primary reactor 14, but the catalyst of the present invention is used both at the primary reactor 14 and the secondary reactor 15.

Figure 5:
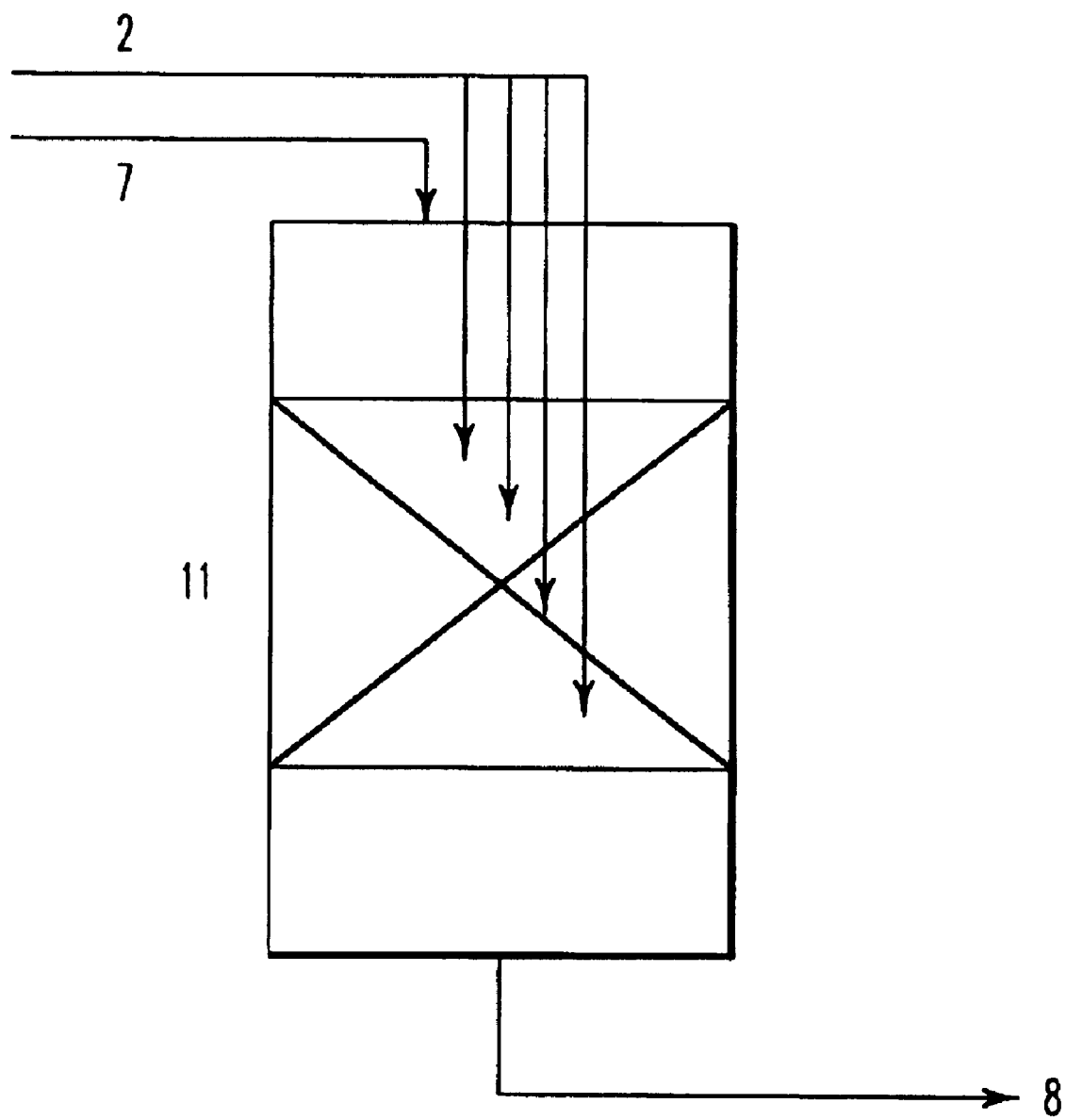
FIG. 5 is a fourth example of an autothermal reforming reactor.

FIG. 5 shows a method in which a mixture gas 7 used for a conventional autothermal reforming reaction is introduced into the top of a reactor 11, and a portion of oxygen 2 is divided and introduced into one or more portions of the catalyst layer. In autothermal reforming reaction, the oxidation reaction by oxygen proceeds first, after which reforming reaction by steam tends to proceed. Therefore, at the upper portion of the catalyst layer, heat is emitted by the oxidation reaction, and at the lower portion, the heat tends to be absorbed by the reforming reaction making use of steam. A temperature distribution may be created within the catalyst layer. In such case, by dispersively introducing oxygen into a variety of portions of the catalyst layer, the heat balance between the exothermic and the endothermic reactions is maintained, to thereby enable the autothermal reforming reaction to proceed suitably on the whole.

In the case in which steam or oxygen is divided and introduced as described above, the amount of introduced steam or oxygen is defined not as the amount of steam or oxygen in a mixture gas introduced through the inlet of the reactor, but as the total amount of steam or oxygen introduced into the reactor.

(4) Reaction Conditions

Preferably, the catalysts of the present invention are subjected to reduction treatment prior to the initiation of reaction. The reduction treatment is typically carried out at 400° C.–900° C. in a hydrogen stream for 1–10 hours. The reduction treatment is typically carried out by passing hydrogen or a hydrogen-containing gas through the catalyst layer while the catalyst layer is heated to the reaction temperature.

The temperature of autothermal reforming reaction is preferably 200° C.–1,200° C. in the case where the reaction is performed by use of only oxygen and steam as reforming gas, more preferably 400° C.–1,100° C., most preferably 400° C.–900° C. Within the above-described temperature range, a comparatively low temperature can be employed in the case in which alcohols or ethers are used as feedstocks; however, a temperature of 500° C.–900° C. is preferable in the case in which hydrocarbons are used as feedstocks. Further, in the case where the reaction is performed by addition of carbon dioxide, reaction temperature is preferably 200° C.–1,300° C.; more preferably 400° C.–1,200° C.; particularly preferably 600° C.–1,100° C. Within the above-described temperature range, a comparatively low temperature can be employed in the case in which alcohols or ethers are used as feedstocks. However, a comparatively high temperature is preferable in the case in which hydrocarbons are used as feedstocks.

The reaction pressure is not limited, and may be selected in accordance with the object of use of the produced synthesis gas. The pressure is typically 0 kg/cm$^2$G–100 kg/cm$^2$G, preferably 0 kg/cm$^2$G–50kg/cm$^2$G, more preferably 0 kg/cm$^2$G–30 kg/cm$^2$G. When the reaction pressure is more than 100 kg/cm$^2$G, the amount of produced methane becomes large in accordance with the equilibrium, and coke tends to deposit. Within the pressure range, the pressure is preferably 20 kg/cm²G–100 kg/cm²G in the case in which synthesis gas for production of synthetic gasoline, synthetic gas oil, or methanol is produced. The pressure is preferably about 20 kg/cm²G, particularly in the case in which highly pure hydrogen (purity: 97%) is produced. In order to produce feed gas used for fuel cell or fuel gas, the pressure is preferably 0 kg/cm²G–10 kg/cm²G.

When a fixed-bed-flow-type reactor is used and a gaseous feedstock is used for autothermal reforming reaction, the gas hourly space velocity (GHSV) of flow feedstocks (feedstocks and reforming gas) is typically 1,000 h⁻¹–100,000 h⁻¹, preferably 1,000 h⁻¹–50,000 h⁻¹, more preferably 1,500 h⁻¹–40,000 h⁻¹. When a mixture gas containing carbon dioxide is used as feedstock, the carbon dioxide is also considered a feedstock. However, a gas which does not directly participate in autothermal reforming reaction, such as nitrogen or helium, is not considered a feedstock.

When liquid feedstock is used, the weight hourly space velocity (WHSV) is typically 0.05–100 h⁻¹, preferably 0.1–10 h¹. The above-described weight hourly space velocity is calculated based on the amounts of only feedstocks other than reforming gases.

Reforming of hydrocarbons by use of carbon dioxide will next be described.

Reforming of hydrocarbons by use of carbon dioxide is defined herein as a reaction of producing a synthesis gas by use of carbon dioxide as an oxidizing agent. The reforming is different from reforming of hydrocarbons by use of steam as an oxidizing agent in the composition of the produced synthesis gas. Reforming in which the hydrocarbon is methane, which is the most typical example, will be described in detail. The difference between reforming by use of carbon dioxide and reforming by use of steam is as follows.

(Reforming by use of carbon dioxide)

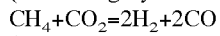

$CH_4 + CO_2 = 2H_2 + 2CO$ (Reforming by use of steam)

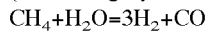

$CH_4 + H_2O = 3H_2 + CO$

That is, in the reforming reaction of hydrocarbons by use of carbon dioxide the ratio of hydrogen to carbon monoxide in the produced synthesis gas is 1/1, whereas in the reforming reaction of hydrocarbons by use of steam the ratio of hydrogen to carbon monoxide in the produced synthesis gas is 3/1. According to the present invention, there can be produced such synthesis gas having a comparatively high carbon monoxide content and a comparatively low hydrogen content.

In the case in which methanol, synthetic gas oil, or synthetic gasoline (Fischer-Tropsch reaction) is produced from a synthesis gas, the stoichiometric ratio of hydrogen to carbon monoxide is 2/1. In the case in which dimethyl ether is produced, the stoichiometric ratio of hydrogen to carbon monoxide is 1/1. Therefore, in the case in which the synthesis gas serving as feedstock used for such reactions is produced, reforming of hydrocarbons by use of carbon dioxide, or a combination of reforming of hydrocarbons by use of carbon dioxide and reforming of hydrocarbons by use of steam is more advantageous than is the conventional reforming of hydrocarbons by use of steam.

In the present invention, a catalyst comprising a zirconia carrier carrying ruthenium or a catalyst comprising an inorganic oxide carrier carrying ruthenium and zirconia is used. However, the starting materials and the methods for preparing such catalysts—for example, the carriers and methods for preparation thereof, metal-component compounds used for being carried, carrying conditions, and methods for carrying—are the same as those used in autothermal reforming. Therefore, the explanation thereof will not be repeated.

The method for reforming hydrocarbons by use of carbon dioxide according to the present invention can be used in the same way as are the conventional methods for reforming hydrocarbons by use of steam and for reforming hydrocarbons by use of carbon dioxide. The embodiments of the typical method of reforming hydrocarbons by use of carbon dioxide will be described below.

(1) Feedstocks (Hydrocarbons)

Hydrocarbons used for the reaction are not particularly limited, and include saturated aliphatic hydrocarbons such as methane, ethane, propane, butane, pentane, hexane, cyclopentane, and cyclohexane; unsaturated aliphatic hydrocarbons such as ethylene, propylene, and butene; and aromatic hydrocarbon such as benzene, toluene, and xylene. That is, the same feedstocks used in the above-described autothermal reforming reaction can be used.

The ratio of feedstock hydrocarbons to carbon dioxide may be appropriately selected in accordance with the composition of produced synthesis gas and the target conversion. Typically, the ratio of carbon dioxide to carbon, i.e., the number of carbon dioxide molecules/the number of carbon atoms in the hydrocarbons, is 1–20. When the ratio of carbon dioxide to carbon is less than 1, unreacted hydrocarbons may remain in the produced synthesis gas, because an oxidizing agent is stoichiometrically insufficient. A ratio of carbon dioxide to carbon of more than 20 is not practically usable because carbon dioxide contained in the produced synthesis gas becomes excessive.

With regard to carbon dioxide used for the reaction, pure carbon dioxide may be used, and carbon dioxide containing other gases serving as oxidizing agents for reforming hydrocarbons, such as steam, carbon monoxide, or oxygen, may also be used. Particularly, since steam can reform hydrocarbons, as can carbon dioxide, steam may be appropriately added in accordance with the target composition of produced synthesis gas as described above. Addition of steam can effectively suppress deposition of coke on the catalyst.

When the ratio of carbon monoxide to hydrogen in the produced synthesis gas is adjusted, or steam is added, to thereby suppress the deposition of coke on the catalyst, preferably, the proportions of these three components, i.e., hydrocarbons, carbon dioxide, and steam, are adjusted. When steam is added in order to suppress deposition of coke on the catalyst, addition of a large amount of steam is preferable. However, since addition of excessive steam increases the ratio of hydrogen to carbon monoxide in the produced synthesis gas because water gas shift reaction proceeds, the reaction results in resembling reforming reaction by use of steam. Preferably, the amount of steam is selected such that the ratio of steam to carbon contained in hydrocarbons is less than 10. When hydrocarbons is reformed by use of carbon dioxide and steam, preferably, the ratio of carbon dioxide to carbon is 20/80 to 70/30.

(2) Reaction Conditions

Preferably, the catalysts of the present invention are subjected to reduction treatment prior to the initiation of reaction. The reduction treatment is carried out at 400° C.–900° C. in a stream of hydrogen for 1–10 hours. The reduction treatment is typically carried out by passing hydrogen or a hydrogen-containing gas through the catalyst layer while the catalyst layer is heated to the reaction temperature.

The reaction type employed is not limited, and may be selected from the group consisting of fixed-bed type, moving-bed type, and fluidized-bed type. Generally, a fixed-bed reactor is used.

The reaction temperature is preferably 200° C.–1,200° C., more preferably 400° C.–1,100° C., particularly preferably 500° C.–900° C.

The reaction pressure is not particularly limited, and may be selected in accordance with the object of use of the produced synthesis gas. When the produced synthesis gas is to be used for production of synthetic gasoline, synthetic gas oil, or methanol, a high reaction pressure (about 20 kg/cm²G–100 kg/cm²G) is preferable. When highly pure hydrogen (purity: 97%) is to be produced, the pressure is preferably about 20 kg/cm²G. However, when the reaction pressure is excessively high, an appropriate pressure is practically selected because the amount of produced methane becomes large in accordance with the equilibrium, and coke tends to deposit in a large amount. In order to produce feedstocks to be used for fuel cells or fuel gas, the pressure is preferably 0 kg/cm²G–10 kg/cm²G. The reaction pressure is typically 0 kg/cm²G–100 kg/cm²G, preferably 0 kg/cm²G–50 kg/cm²G, more preferably 0 kg/cm²G–30 kg/cm²G.

When a fixed-bed-flow-type reactor is used, the gas hourly space velocity (GHSV) of feedstocks (hydrocarbons and carbon dioxide) is 1,000 h$^{-1}$–100,000 h$^{-1}$; preferably 1,000 h$^{-1}$–50,000 h$^{-1}$; more preferably 1,500 h$^{-1}$–40,000 h$^{-1}$. When a mixture gas containing steam is used as starting material, the steam is considered a feedstock. However, a gas which does not directly participate in the reforming reaction of hydrocarbons such as nitrogen or helium is not considered a feedstock.

EXAMPLES

The present invention will next be described in detail by way of examples, which should not be construed as limiting the invention thereto.

First, autothermal reforming reaction of the present invention will be described.

Example 1
(1) Preparation of Catalyst

Zirconium hydroxide (200 g) was calcined at 500° C. for one hour, to thereby obtain zirconia carrier I. After the carrier I was dipped in an aqueous solution of ruthenium chloride, the solution was heated and stirred at 80° C. for one hour, to thereby evaporate water. The product was further dried at 120° C. for 6 hours. Subsequently, the resultant dried product was calcined at 500° C. for one hour. The calcined product was sieved, to thereby obtain a of catalyst I having a particle diameter of 16–32 mesh. Catalyst I contained 0.5 wt. % ruthenium. The composition of catalyst I is shown in Table 1.
(2) Production of Hydrogen A fixed-bed-flow-type reactor was filled with catalyst I. Autothermal reforming reaction was carried out therein by use of a mixture gas including desulfurized naphtha, steam, and oxygen as materials so as to obtain hydrogen. The composition of the desulfurized naphtha is shown in Table 4. The reaction conditions are shown in Table 5, and the results of reaction are shown in Table 6.

Example 2

The procedure of Example 1 was carried out except that the carrier I was dipped in an aqueous solution of ruthenium chloride and cobalt nitrate, to thereby obtain catalyst II. Autothermal reforming reaction was carried out by use of catalyst II under the same reaction conditions as in Example 1. The composition of catalyst II is shown in Table 1. The results of the reaction are shown in Table 6.

Example 3

The procedure of Example 1 was carried out except that the carrier I was dipped in an aqueous solution containing ruthenium chloride, cobalt nitrate, and magnesium nitrate, to thereby obtain catalyst III. An autothermal reforming reaction was carried out by use of catalyst III under the same reaction conditions as in Example 1. The composition of catalyst III is shown in Table 1. The results of the reaction are shown in Table 6.

Example 4
(1) Preparation of Catalyst

Water (20 wt. %) was added to an α-alumina powder, and the mixture was kneaded by use of a kneader. The kneaded product was compression-molded, to thereby obtain cylindrical molded products having a diameter of 5 mm and a length of 5 mm. The products were dried by use of a burner-furnace-exhaust gas (100° C.–300° C.), and calcined at 1280° C. for 26 hours, to thereby obtain alumina carrier II.

Subsequently, ruthenium trichloride (RuCl$_3$.nH$_2$O; containing Ru (38%)) (0.66 g) and cobalt nitrate (Co(NO$_3$)$_3$.6H$_2$O) (2.47 g) were added to an aqueous solution of zirconium oxychloride (ZrO(OH)Cl) (Zr content as reduced to ZrO$_2$ (2.5 g)), and the mixture was stirred for one hour or more, to thereby dissolve the compounds. The total amount of the solution became 10 cc, and the solution was used as a solution for impregnation. The above-described carrier II (50 g) was impregnated with the resultant solution by use of a pore-filling method, dried at 120° C. for 5 hours, calcined at 500° C. for 2 hours, and sieved, to thereby obtain catalyst IV having a particle diameter of 16–32 mesh. The composition and physical properties of catalyst IV are shown in Table 2.
(2) Production of Hydrogen By use of catalyst IV, the same autothermal reforming reaction as in Example 1 was carried out. The results of reaction by catalyst IV are shown in Table 6.

Example 5

The procedure of Example 4 was carried out to thereby prepare a solution for impregnation (10 cc), except that ruthenium trichloride (RuCl$_3$.nH$_2$O; containing Ru (38%)) (0.66 g), cobalt nitrate (Co(NO$_3$)$_3$.6H$_2$O) (2.47 g), and magnesium nitrate (Mg(NO$_3$)$_2$.6H$_2$O) (6.36 g) were added to an aqueous solution of zirconium oxychloride (ZrO(OH)Cl) (Zr content as reduced to ZrO$_2$ (2.5 g)). Furthermore, the procedure of Example 4 was carried out to thereby prepare catalyst V, except that the resultant solution for impregnation and carrier II were used. By use of catalyst V, the same autothermal reforming reaction as in Example 1 was carried out. The composition and physical properties of catalyst V are shown in Table 2, and the results of reaction are shown in Table 6.

Example 6
(1) Production of a Synthesis Gas

By use of catalyst V obtained in Example 5, a synthesis gas having a ratio of hydrogen to carbon monoxide of 2/1 was produced. Autothermal reforming reaction was carried out by use of a mixture gas including methane, oxygen, steam, and carbon dioxide as feedstocks. The reaction conditions are shown in Table 5. The results of reaction are shown in Table 6.

Example 7

The procedure of Example 4 was carried out to thereby obtain catalyst VII, except that commercially-available γ-alumina carrier III was used and the amount of water to be added was changed such that the amount of obtained solution for impregnation became 30 cc. The composition of catalyst VII is shown in Table 2.

Example 8

The procedure of Example 5 was carried out to thereby obtain catalyst VIII, except that commercially-available γ-alumina carrier III was used and the amount of water to be added was changed such that the amount of obtained solution for impregnation became 30 cc. The composition of catalyst VIII is shown in Table 3.

Comparative Example 1

Nickel nitrate (Ni (NO$_3$)$_2$.6H$_2$O) (5.0 g) was dissolved in water, to thereby obtain a solution for impregnation (10 cc). α-Alumina carrier II was impregnated with the solution for impregnation, and was dried in the same method as in Example 4. A cycle of impregnation and drying was repeated 5 times. Subsequently, catalyst IX was prepared according to the same procedure as in Example 4. By use of catalyst IX, autothermal reforming reaction was carried out under the same reaction conditions as in Example 1. The composition of catalyst IX is shown in Table 3, and the results of reaction are shown in Table 6.

Comparative Example 2

Ruthenium trichloride (RuCl$_3$.nH$_2$O; containing Ru (38%)) (0.66 g) was dissolved in water, to thereby obtain a solution for impregnation (10 cc). The procedure of Example 4 was performed to thereby prepare catalyst X, except that α-alumina carrier II was impregnated with the resultant solution for impregnation (10 cc). By use of catalyst X, autothermal reforming reaction was carried out under the same reaction conditions as in Example 1. The composition of catalyst X is shown in Table 3, and the results of reaction are shown in Table 6.

TABLE 1

Compositions of catalysts carried on zirconia

| | Catalyst | | |
|---|---|---|---|
| | Catalyst I | Catalyst II | Catalyst III |
| | Example No. | | |
| Metal component (wt. %) | Example 1 | Example 2 | Example 3 |
| Zirconium | — | — | — |
| Ruthenium | 0.5 | 0.5 | 0.5 |
| Cobalt | — | 1.0 | 1.0 |
| Magnesium* | — | — | 2.0 |
| Nickel | — | — | — |

*Magnesium: as reduced to MgO

TABLE 2

Compositions and physical properties of alumina

| | Catalyst | | |
|---|---|---|---|
| | Catalyst IV | Catalyst V | Catalyst VII |
| | Example No. | | |
| | Example 4 | Examples 5 and 6 | Example 7 |
| Metal component (wt. %) | | | |
| Zirconium* | 5.0 | 5.0 | 5.0 |
| Ruthenium | 0.5 | 0.5 | 0.5 |
| Cobalt | 1.0 | 1.0 | 1.0 |
| Magnesium* | — | 2.0 | — |
| Nickel | — | — | — |
| Physical properties | | | |
| Specific surface area (m$^2$/g) | 13.5 | 10.4 | |
| Micropore capacity** (cc/g) | 0.26 | 0.26 | |

*Zirconium and magnesium: as reduced to ZrO$_2$ and MgO
**Micropore capacity before carrying metal

TABLE 3

Compositions of catalysts carried on alumina

| | Catalyst | | |
|---|---|---|---|
| | Catalyst VIII | Catalyst IX | Catalyst X |
| | Ex. & Comp. Ex. No. | | |
| | Example 8 | Comp. Ex. 1 | Comp. Ex. 2 |
| Metal component (wt. %) | | | |
| Zirconium* | 5.0 | — | — |
| Ruthenium | 0.5 | — | 0.5 |
| Cobalt | 1.0 | — | — |
| Magnesium* | 2.0 | — | — |
| Nickel | — | 10 | — |

*Zirconium and magnesium; as reduced to ZrO$_2$ and MgO
**Micropore capacity before carrying metal

TABLE 4

Compositions of desulfurized naphtha (wt. %)

| Number of carbon in a molecule | Paraffin | Naphthene | Aromatics | Total |
|---|---|---|---|---|
| 5 | 0.4 | 0.1 | — | 0.5 |
| 6 | 12.0 | 4.3 | 0.7 | 17.0 |
| 7 | 34.6 | 9.6 | 4.8 | 49.0 |
| 8 | 13.8 | 5.2 | 4.4 | 23.4 |
| 9 | 7.2 | 1.8 | 0.7 | 9.7 |
| ≧10 | 0.2 | 0.1 | 0.1 | 0.4 |
| Total | 68.2 | 21.1 | 10.7 | 100.0 |
| Sulfur content | Less than limit of measurement* | | | |

*Limit of measurement of sulfur: 20 ppb

TABLE 5

Reaction conditions for autothermal reforming

| Items | Example 1 et al | Example 6 |
|---|---|---|
| | Feedstocks | |
| | Desulfurized naphtha | Methane |
| Reforming gas* | | |
| Oxygen/C | 0.4 | 0.6 |
| Steam/C | 2.5 | 0.6 |
| Carbon dioxide/C | | 0.12 |
| Reaction conditions | | |
| Temperature (° C.) | 800 | 1,000 |
| Pressure (kg/cm² G) | 1.0 | 1.0 |
| Space velocity (h⁻¹) | | |
| (GHSV)** | 4.0 | |
| (WHSV)*** | | 17,000 |

*Compositions are represented by the no. of gas molecules based on the no. of carbon atoms in desulfurized naphtha or methane
**Feed of desulfurized naphtha [(weight/h)/weight of catalyst]
***Total feed of methane and reforming gas [(weight/h)/weight of catalyst]

TABLE 6

Results of autothermal reforming

| | Catalyst | HC conversion %* | Deposition of carbon** |
|---|---|---|---|
| Example 1 | I | 84.0 | 0.2 |
| Example 2 | II | 88.4 | 0.1 |
| Example 3 | III | 96.1 | *** |
| Example 4 | IV | 91.7 | 0.1 |
| Example 5 | V | 96.5 | *** |
| Example 6 | V | 99.2 | 0.1 |
| Comp. Ex. 1 | IX | 75.2 | 1.0 |
| Comp. Ex. 2 | X | 77.8 | 0.7 |

*HC conversion % = [1−(no. of carbon atoms of hydrocarbon in product)/(no. of carbon atoms of hydrocarbon in feedstock) × 100
**Relative amount of carbon deposited on catalyst after reaction for 10 hours ("the amount in Comp. Ex. 1 is 1.0)
***Below measurement limit (0.1)

Reforming reaction of hydrocarbons using carbon dioxide will next be described in detail.

Example 9

(1) Preparation of Catalyst

Zirconium hydroxide (200 g) was calcined at 500° C. for one hour, to thereby obtain zirconia carrier IV. After the carrier IV was dipped in an aqueous solution of ruthenium chloride, the solution was heated and stirred at 80° C. for one hour, to thereby evaporate water. The product was further dried at 120° C. for 6 hours. Subsequently, the dried product was calcined at 500° C. for one hour. The resultant calcined product was sieved, to thereby obtain a of catalyst XI having a particle diameter of 16–32 mesh. Catalyst XI contained 0.5 wt. % ruthenium. The composition of catalyst XI is shown in Table 7.

(2) Reformation of Hydrocarbon using Carbon Dioxide

A fixed-bed-flow-type reactor was filled with catalyst XI. Reforming reaction of hydrocarbons using carbon dioxide was carried out therein by use of a mixture gas including methane and carbon dioxide (the ratio of methane to carbon dioxide: 1/1) as feedstocks. The reaction conditions are shown in Table 10, and the results of reaction are shown in Table 11.

Example 10

The procedure of Example 9 was carried out, except that an aqueous solution in which ruthenium chloride and cobalt nitrate were dissolved was used, to thereby obtain catalyst XII. Reforming reaction of hydrocarbon using carbon dioxide was carried out under the same reaction conditions as in Example 9. The composition of catalyst XII is shown in Table 7. The results of the reaction are shown in Table 11.

Example 11

The procedure of Example 9 was carried out, except that an aqueous solution in which ruthenium chloride, cobalt nitrate, and magnesium nitrate were dissolved was used, to thereby obtain catalyst XIII. Reforming reaction of hydrocarbon using carbon dioxide was carried out under the same reaction conditions as in Example 9. The composition of catalyst XIII is shown in Table 7. The results of the reaction are shown in Table 11.

Example 12

(1) Preparation of Catalyst

Water (20 wt. %) was added to an α-alumina powder, and the mixture was kneaded by use of a kneader. The kneaded product was compression-molded, to thereby obtain cylindrical molded products having a diameter of 5 mm and a length of 5 mm. The products were dried by use of a burner-furnace-exhaust gas (100° C.–300° C.), and calcined at 1280° C. for 26 hours, to thereby obtain alumina carrier V.

Subsequently, ruthenium trichloride (RuCl$_3$.nH$_2$O; containing Ru (38 %)) (0.66 g) and cobalt nitrate (Co(NO$_3$)$_3$.6H$_2$O) (2.47 g) were added to an aqueous solution of zirconium oxychloride (ZrO(OH)Cl) (Zr content as reduced to ZrO$_2$ (2.5 g)), and the mixture was mixed for one hour or more, to thereby dissolve the compounds. The total amount of the solution became 10 cc, and the solution was used as a solution for impregnation. The above-described carrier V (50 g) was impregnated with the solution for impregnation by use of a pore-filling method, dried at 120° C. for 5 hours, calcined at 500° C. for 2 hours, and sieved, to thereby obtain catalyst XIV having a particle diameter of 16–32 mesh. The composition and physical properties of catalyst XIV are shown in Table 8.

(2) Reforming of Hydrocarbons using Carbon Dioxide

By use of catalyst XIV, the same reforming reaction of hydrocarbons as in Example 9 was carried out. The results of reaction by catalyst XIV are shown in Table 11.

Example 13

The procedure of Example 12 was carried out to thereby prepare a solution for impregnation (10 cc), except that ruthenium trichloride (RuCl$_3$.nH$_2$O; containing Ru (38%)) (0.66 g), cobalt nitrate (Co(NO$_3$)$_3$.6H$_2$O) (2.47 g), and magnesium nitrate (Mg (NO$_3$)$_2$.6H$_2$O) (6.36 g) were added to an aqueous solution of zirconium oxychloride (Zro(OH)Cl) (Zr content as reduced to ZrO$_2$ (2.5 g)). Furthermore, the procedure of Example 12 was carried out to prepare catalyst XV, except that the resultant solution for impregnation was used. Reforming reaction of hydrocarbons using carbon dioxide was carried out by use of catalyst XV under the same reaction conditions as in Example 9. The composition and physical properties of catalyst XV are shown in Table 8, and the results of reaction are shown in Table 11.

Example 14

By use of catalyst XV obtained in Example 13, reforming reaction of hydrocarbon of Example 9 using carbon dioxide was repeated except that a mixture gas including methane, carbon dioxide, and steam (the proportions of methane to carbon dioxide and steam: 1/1/1) was used as feedstock. The reaction conditions of the reforming reaction are shown in Table 10. The results of reaction are shown in Table 11.

Example 15

Carrying of a metal component, drying, and calcining of a carrier performed in Example 12 were carried out to thereby obtain catalyst XVII, except that commercially-available γ-alumina carrier VI was used, and the amount of water to be added was changed such that the amount of obtained solution for impregnation became 30 cc. The composition of catalyst XVII is shown in Table 8.

Example 16

The procedure of Example 13 was carried out to thereby obtain catalyst XVIII, except that commercially-available γ-alumina carrier VII was used and the amount of water to be added was changed such that the amount of obtained solution for impregnation became 30 cc. The composition of catalyst XVIII is shown in Table 9.

Example 17

By use of catalyst XV obtained in Example 13, reforming reaction of hydrocarbon of Example 6 using carbon dioxide was carried out, except that a mixture gas including methane, carbon dioxide, and steam (the proportion of methane to carbon dioxide and steam: 3/3/4) was used as feedstock and the pressure of reaction was elevated to 5 kg/cm²G. The reaction conditions of the reforming reaction are shown in Table 10. The results of reaction are shown in Table 11.

Comparative Example 3

Nickel nitrate (Ni (NO$_3$)$_2$.6H$_2$O (5.0 g) was dissolved in water, to thereby obtain a solution for impregnation (10 CC). α-Alumina carrier V was impregnated with the solution for impregnation instead of the solution for impregnation used in Example 12, and was dried by the same method as in Example 12. A cycle of impregnation and drying was repeated 5 times. The procedure of Example 12 was carried out except for the above-described impregnation processes, to thereby obtain catalyst XIX. By use of catalyst XIX, reforming reaction of hydrocarbon using carbon dioxide was carried out under the same reaction conditions as in Example 9. The composition of catalyst XIX is shown in Table 9. The results of the reaction are shown in Table 11.

Comparative Example 4

Ruthenium trichloride (RuCl$_3$.nH$_2$O, containing Ru (38%)) (0.66 g) was dissolved in water, to thereby obtain a solution for impregnation (10 CC). α-Alumina carrier V was impregnated with the solution for impregnation instead of the solution for impregnation used in Example 12. The procedure of Example 12 was carried out except for the above-described impregnation processes, to thereby obtain catalyst XX. By use of catalyst XX, reforming reaction of hydrocarbons using carbon dioxide was carried out under the same reaction conditions as in Example 9. The composition of catalyst XX is shown in Table 9. The results of the reaction are shown in Table 11.

TABLE 7

Compositions of catalysts carried on zirconia

| | Catalyst | | |
|---|---|---|---|
| | Catalyst XI | Catalyst XII | Catalyst XIII |
| | Example (reforming reaction) No. | | |
| Metal component (wt. %) | Example 9 | Example 10 | Example 11 |
| Zirconium | — | — | — |
| Ruthenium | 0.5 | 0.5 | 0.5 |
| Cobalt | — | 1.0 | 1.0 |
| Magnesium* | — | — | 2.0 |
| Nickel | — | — | — |

*Magnesium: as reduced to MgO

TABLE 8

Compositions and physical properties of alumina

| | Catalyst | | |
|---|---|---|---|
| | Catalyst XIV | Catalyst XV | Catalyst XVII |
| | Example (reforming reaction) No. | | |
| | Example 12 | Examples 13, 14 and 17 | Example 15 |
| Metal component (wt. %) | | | |
| Zirconium* | 5.0 | 5.0 | 5.0 |
| Ruthenium | 0.5 | 0.5 | 0.5 |
| Cobalt | 1.0 | 1.0 | 1.0 |
| Magnesium* | — | 2.0 | — |
| Nickel | — | — | — |
| Physical properties | | | |
| Specific surface area (m²/g) | 13.5 | 10.4 | |
| **Micropore capacity (cc/g) | 0.26 | 0.26 | |

*Zirconium and magnesium: as reduced to ZrO$_2$ and MgO
**Micropore capacity before carrying metal

TABLE 9

Compositions of catalysts carried on alumina

| | Catalyst | | |
|---|---|---|---|
| | Catalyst XVIII | Catalyst XIX | Catalyst XX |
| | Ex. & Comp. Ex. No. | | |
| Metal component (wt. %) | Example 16 | Comp. Ex. 3 | Comp. Ex. 4 |
| Zirconium* | 5.0 | — | — |
| Ruthenium | 0.5 | — | 0.5 |
| Cobalt | 1.0 | — | — |
| Magnesium* | 2.0 | — | — |
| Nickel | — | 10 | — |

*Zirconium and magnesium: as reduced to ZrO$_2$ and MgO

TABLE 10

Conditions for reforming reaction of hydrocarbon

| Items | Example 9 | Example 14 | Example 17 |
|---|---|---|---|
| Composition of feedstock (vol. %) | | | |
| Methane | 50 | 100/3 | 30 |
| Carbon dioxide | 50 | 100/3 | 30 |
| Steam | 100/3 | 40 | |
| Reaction conditions | | | |
| Temperature (° C.) | 780 | 780 | 780 |
| Pressure (kg/cm² G) | 1.0 | 1.0 | 5.0 |
| Space velocity (h⁻¹) (GHSV) | 17,000 | 17,000 | 17,000 |

TABLE 11

Results of reforming reaction of hydrocarbon

| | CO yield (mol %)* | |
|---|---|---|
| | After 1 h | After 10 h |
| Example 9 | 80 | 77 |
| Example 10 | 85 | 83 |
| Example 11 | 85 | 85 |
| Example 12 | 85 | 83 |
| Example 13 | 85 | 85 |
| Example 14 | 85 | 85 |
| Example 17 | 81 | 81 |
| Comp. Ex. 3 | 78 | 60 |
| Comp. Ex. 4 | 75 | 68 |

*(amount of CO in product: mol)/(amount of $CO_2$ + $CH_4$ in feedstock: mol) × 100

As described hereinabove, use of the catalyst of the present invention provides high conversion in autothermal reforming reaction of desulfurized naphtha and hydrocarbon reforming reaction making use of carbon dioxide. Only a small amount of coke is deposited on the catalyst of the present invention after autothermal reforming reaction for 10 hours. In addition, the catalyst of the present invention has proven to be suitable for producing a synthesis gas from methane by use of reforming gas containing carbonic oxide gas. High yield of carbon monoxide is provided by application of the catalyst of the present invention to hydrocarbon reforming reaction making use of carbon dioxide. The yield remains constant and coke is deposited in a small amount even after long-term service of the catalyst of the present invention.

What is claimed is:

1. A method for autothermal reforming to produce hydrogen or a synthesis gas, comprising contacting a feedstock as a starting material and a reforming gas comprising oxygen and steam with a catalyst,
   wherein
      the catalyst comprises ruthenium supported on a zirconia carrier and an amount of ruthenium supported on the carrier is from 0.05 to 20 wt. % based on the entirety of the catalyst;
      a ratio of steam to the feedstock fed to the reaction system is from 0.4 to 4 in terms of the number of water molecules/the number of carbon atoms in the feedstock; and
      a ratio of oxygen to the feedstock fed to the reaction system is from 0.2 to 0.8 in terms of the number of oxygen molecules/the number of carbon atoms in the feedstock.

2. A method for autothermal reforming to produce hydrogen or a synthesis gas, comprising contacting a feedstock as a starting material and a reforming gas comprising oxygen and steam with a catalyst,
   wherein
      the catalyst comprises zirconium and ruthenium supported on an inorganic oxide carrier and an amount of zirconium on the carrier is from 0.05 to 20 wt. % as reduced to $ZrO_2$ based on the entirety of the catalyst;
      a ratio of steam to the feedstock fed to the reaction system is from 0.4 to 4 in terms of the number of water molecules/the number of carbon atoms in the feedstock;
      and a ratio of oxygen to the feedstock fed to the reaction system is from 0.2 to 0.8 in terms of the number of oxygen molecules/the number of carbon atoms in the feedstock.

3. The method according to claim 2, wherein the starting material is a hydrocarbon.

4. The method according to claim 3, wherein the hydrocarbon is at least one member selected from the group consisting of methane, liquefied petroleum gas, naphtha, kerosene, and gas oil.

5. The method according to claim 2, wherein the feedstock is at least one member selected from the group consisting of methanol, ethanol, and dimethyl ether.

6. The method according to claim 2, wherein the reforming gas comprises a mixture of oxygen, steam and carbon dioxide.

7. A method for reforming hydrocarbon, comprising contacting the hydrocarbon and carbon dioxide gas with a catalyst,
   wherein
      the catalyst comprises ruthenium supported on a zirconia carrier and an amount of ruthenium supported on the carrier is from 0.05 to 20 wt. % based on the entirety of the catalyst; and
      a ratio of feedstock hydrocarbons to carbon dioxide is from 0.1 to 3 in terms of the number of carbon dioxide molecules/the number of carbon atoms in the hydrocarbons.

8. The method according to claim 7, wherein the catalyst supported on the zirconia carrier further contains at least one member selected from the group consisting of cobalt and magnesium.

9. The method according to claim 8, wherein the cobalt content is from 0.01 to 30 based on the atomic ratio of cobalt to ruthenium.

10. The method according to claim 8, wherein the magnesium content is from 0.5 to 20 wt. % as reduced to MgO based on the entirety of the catalyst.

11. The method according to claim 7, wherein the hydrocarbon is methane.

12. The method for reforming hydrocarbon according to claim 7, wherein the hydrocarbon is a natural gas.

13. The method for reforming hydrocarbon according to claim 7, wherein carbon dioxide gas and steam contact the catalyst, a ratio of steam to carbon contained in the hydrocarbon is less than 10, and a ratio of carbon dioxide to carbon contained hydrocarbon is from 20/80 to 70/30.

14. A method for reforming hydrocarbon, comprising contacting the hydrocarbon and carbon dioxide gas with a catalyst comprising zirconium and ruthenium supported on an inorganic oxide carrier, wherein
>the catalyst comprises an amount of zirconium supported on the carrier of from 0.05 to 20 wt. % zirconium as reduced to $ZrO_2$ based on the entirety of the catalyst; and
>a ratio of feedstock hydrocarbons to carbon dioxide is from 0.1 to 3 in terms of the number of carbon dioxide molecules/the number of carbon atoms in the hydrocarbons.

15. The method according to claim 14, wherein the ruthenium is present in an amount of from 0.05 to 20 wt. %.

16. The method according to claim 14, wherein the inorganic oxide carrier comprises alumina.

17. The method according to claim 16, wherein the alumina is at least one member selected from the group consisting of α-alumina and γ-alumina.

18. The method according to claim 14, wherein the catalyst supported on the inorganic oxide carrier further contains at least one member selected from the group consisting of cobalt and magnesium.

19. The method according to claim 18, wherein the cobalt content is from 0.01 to 30 based on the atomic ratio of cobalt to ruthenium.

20. The method according to claim 18, wherein the magnesium content is from 0.5 to 20 wt. % as reduced to MgO based on the entirety of the catalyst.

21. The method according to claim 14, wherein ruthenium is present in an amount of from 0.05 to 20 wt. % based on the entirety of the catalyst.

* * * * *

UNITED STATES PATENT AND TRADEMARK OFFICE
CERTIFICATE OF CORRECTION

PATENT NO.   : 6,749,828 B1
DATED        : June 15, 2004
INVENTOR(S)  : Fukunaga It is certified that error appears in the above-identified patent and that said Letters Patent is hereby corrected as shown below:

Title page,
Item [73], Assignee, should read -- [73] Assignee: Idemitsu Kosan Co., Ltd. Tokyo, (JP) --

Signed and Sealed this

Twenty-third Day of November, 2004

JON W. DUDAS
*Director of the United States Patent and Trademark Office*